(12) United States Patent
Chandel et al.

(10) Patent No.: US 10,823,755 B2
(45) Date of Patent: Nov. 3, 2020

(54) SYSTEMS AND METHODS FOR ESTIMATING ERRORS IN GYROSCOPE SENSORS

(71) Applicant: TATA CONSUTANCY SERVICES LIMITED, Maharashtra (IN)

(72) Inventors: Vivek Chandel, Gurgaon (IN); Kartik Muralidharan, Bangaluru (IN); Avik Ghose, Kolkata (IN); Archan Misra, Singapore (SG)

(73) Assignee: Tata Consultancy Services Limited, Mumbai (IN)

( * ) Notice: Subject to any disclaimer, the term of this patent is extended or adjusted under 35 U.S.C. 154(b) by 451 days.

(21) Appl. No.: 15/935,731

(22) Filed: Mar. 26, 2018

(65) Prior Publication Data

US 2019/0056426 A1     Feb. 21, 2019

(30) Foreign Application Priority Data

Aug. 21, 2017   (IN) .............................. 201721029546

(51) Int. Cl.
| | |
|---|---|
| *G01P 21/00* | (2006.01) |
| *G01C 19/5776* | (2012.01) |
| *G01P 3/44* | (2006.01) |
| *G01C 19/00* | (2013.01) |
| *G01C 25/00* | (2006.01) |

(52) U.S. Cl.
CPC .............. *G01P 21/00* (2013.01); *G01C 19/00* (2013.01); *G01C 19/5776* (2013.01); *G01C 25/005* (2013.01); *G01P 3/44* (2013.01)

(58) Field of Classification Search
None
See application file for complete search history.

(56) References Cited

U.S. PATENT DOCUMENTS

| | | | | |
|---|---|---|---|---|
| 8,359,182 | B2 | 1/2013 | Niu et al. | |
| 8,649,999 | B1 * | 2/2014 | Sheng | .................. G06F 3/0346 |
| | | | | 702/141 |
| 9,250,716 | B2 * | 2/2016 | Sheng | .................... G01D 3/028 |
| 9,285,225 | B2 | 3/2016 | Pham et al. | |
| 9,354,080 | B2 | 5/2016 | Buchanan et al. | |
| 2009/0033807 | A1 * | 2/2009 | Sheng et al. | ........... G01R 29/00 |
| | | | | 348/734 |
| 2011/0202225 | A1 * | 8/2011 | Willis | .................. G01C 25/005 |
| | | | | 701/31.4 |

\* cited by examiner

*Primary Examiner* — Aditya S Bhat
(74) *Attorney, Agent, or Firm* — Finnegan, Henderson, Farabow, Garrett & Dunner LLP

(57) ABSTRACT

Embodiments of the present disclosure provide systems and methods that establish non-linear components of gyroscope errors which have not been studied or explored earlier. These errors include but are not limited to non-linear dynamic error which is a function of the angular velocity itself. Bias instability has been observed within the same environment of temperature and atmospheric pressure. In other words, the embodiments of the present disclosure analyse and models static bias errors and dynamic non-linear errors in the gyroscope sensor which may be used to model and correct errors accordingly In subsequent measurements. The system provide solution(s) when there is no way of directly estimating temperature for bias correction of gyroscope, by estimating a temperature change by considering indirect measurements from other sensors present onboard the device.

15 Claims, 5 Drawing Sheets

SYSTEMS AND METHODS FOR ESTIMATING ERRORS IN GYROSCOPE SENSORS

PRIORITY CLAIM

This U.S. patent application claims priority under 35 U.S.C. § 119 to: India Application No. 201721029546, filed on Aug. 21, 2017. The entire contents of the aforementioned application are incorporated herein by reference.

TECHNICAL FIELD

The disclosure herein generally relate to gyroscope sensors, and, more particularly, to systems and methods for estimating errors in gyroscope sensors.

Background

Gyroscopes are inertial sensors for estimating angular velocity in an inertial frame of reference. However, due to the nature of Microelectromechanical Systems (MEMS) based sensors a lot of errors are inherently associated with the measurement. Prior systems and methods have reported bias, scale factors and linear instability with temperature as some of the sources of error. However, even after removing these errors the measurements taken in wild may be far from accurate. Also in practical scenarios, like in personal mobile devices, mostly a temperature sensor is not accessible, which renders the temperature-based correction of gyroscope impossible.

SUMMARY

Embodiments of the present disclosure present technological improvements as solutions to one or more of the above-mentioned technical problems recognized by the inventors in conventional systems. For example, in one aspect, a processor implemented method for estimating errors in gyroscope sensor(s) is provided. The processor implemented method comprising: obtaining a first gyroscopic data and one or more temperature readings, wherein the first gyroscopic data is obtained from a gyroscopic sensor based on a first state of a device associated with the gyroscopic sensor, and wherein the one or more temperature readings are indirectly obtained from another onboard sensor (e.g., a barometer) other than a temperature sensor; dividing the first gyroscopic data into a first set of windows, wherein each window from the first set comprises a specific time period that includes at least a unique subset of the gyroscopic data; calculating a bias for each window from the first set of windows based on a corresponding unique subset of the first gyroscopic data, and a corresponding temperature reading; and based on the calculated bias for each window from the first set of windows and the corresponding temperature reading, generating a temperature dependent model for the gyroscopic sensor.

In an embodiment, the method may further comprise obtaining a second gyroscopic data from the gyroscopic sensor based on a second state of a device associated with the gyroscopic sensor; dividing the second gyroscopic data divided into a second set of windows, wherein each window from the second set comprises a specific time period that includes at least a unique subset of the second gyroscopic data; and determining a third state of the device based on a current window of the second set.

In an embodiment, the method may further comprise based on the third state: updating the bias, using the second gyroscopic data, for the current window; or determining an availability of a temperature reading from the onboard sensor; and based on the availability of the onboard sensor calculating, using the temperature dependent model, a bias from the second gyroscopic data for a current temperature, and determining a state of the device based on a current window of the second set of windows; and estimating a change in the temperature of the device based on the onboard sensor associated with the device.

In an embodiment, the method may further comprise subtracting the calculated bias from the second gyroscopic data for the current temperature, and filtering out one or more dynamic errors from the second gyroscopic data using a non-linear error model.

In an embodiment, the method may further comprise performing a comparison of the change in the temperature with a predefined threshold; and based on the comparison, estimating a bias for a current window.

In another aspect, a system for estimating errors in gyroscope sensor(s) is provided. The system comprising: a memory storing instructions; one or more communication interfaces; and one or more hardware processors coupled to the memory via the one or more communication interfaces, wherein the one or more hardware processors are configured by the instructions to: obtain a first gyroscopic data and one or more temperature readings, wherein the first gyroscopic data is obtained from a gyroscopic sensor based on a first state of a device associated with the gyroscopic sensor, and wherein the one or more temperature readings are indirectly obtained from another onboard sensor (e.g., a barometer) other than a temperature sensor; divide the first gyroscopic data into a first set of windows, wherein each window from the first set comprises a specific time period that includes at least a unique subset of the gyroscopic data; calculate a bias for each window from the first set of windows based on a corresponding unique subset of the first gyroscopic data, and a corresponding temperature reading; and generate a temperature dependent model for the gyroscopic sensor based on the calculated bias for each window from the first set of windows and the corresponding temperature reading.

In an embodiment, the one or more hardware processors are further configured by instructions to: obtain a second gyroscopic data from the gyroscopic sensor based on a second state of a device associated with the gyroscopic sensor; divide the second gyroscopic data divided into a second set of windows, wherein each window from the second set comprises a specific time period that includes at least a unique subset of the second gyroscopic data; and determine a third state of the device based on a current window of the second set.

In an embodiment, based on the third state, the one or more hardware processors are further configured by instructions to update the bias, using the second gyroscopic data, for the current window; or determine an availability of a temperature reading from the onboard sensor; and based on the availability of the onboard sensor, the one or more hardware processors are further configured by instructions to: calculate, using the temperature dependent model, a bias from the second gyroscopic data for a current temperature, and determine a state of the device based on a current window of the second set of windows; and estimate a change in the temperature of the device based on the onboard sensor associated with the device.

In an embodiment, the one or more hardware processors are further configured by instructions to: subtract the calculated bias from the second gyroscopic data for the current temperature, and filtering out one or more dynamic errors from the second gyroscopic data using a non-linear error model.

In an embodiment, the one or more hardware processors are further configured by instructions to perform a comparison of the change in the temperature with a predefined threshold; and based on the comparison, estimate a bias for a current window.

In yet another aspect, one or more non-transitory machine readable information storage mediums comprising one or more instructions is provided. The one or more instructions which when executed by one or more hardware processors causes estimating errors in gyroscope sensor(s) is provided. The instructions comprising obtaining a first gyroscopic data and one or more temperature readings, wherein the first gyroscopic data is obtained from a gyroscopic sensor based on a first state of a device associated with the gyroscopic sensor, and wherein the one or more temperature readings are (indirectly) obtained from another onboard sensor (e.g., a barometer) other than a temperature sensor; dividing the first gyroscopic data into a first set of windows, wherein each window from the first set comprises a specific time period that includes at least a unique subset of the gyroscopic data; calculating a bias for each window from the first set of windows based on a corresponding unique subset of the first gyroscopic data, and a corresponding temperature reading; and based on the calculated bias for each window from the first set of windows and the corresponding temperature reading, generating a temperature dependent model for the gyroscopic sensor.

In an embodiment, the instructions may further comprise obtaining a second gyroscopic data from the gyroscopic sensor based on a second state of a device associated with the gyroscopic sensor; dividing the second gyroscopic data divided into a second set of windows, wherein each window from the second set comprises a specific time period that includes at least a unique subset of the second gyroscopic data; and determining a third state of the device based on a current window of the second set.

In an embodiment, the instructions may further comprise based on the third state: updating the bias, using the second gyroscopic data, for the current window; or determining an availability of a temperature reading from the onboard sensor; and based on the availability of the onboard sensor calculating, using the temperature dependent model, a bias from the second gyroscope data for a current temperature, and determining a state of the device based on a current window of the second set of windows; and estimating a change in the temperature of the device based on the onboard sensor associated with the device.

In an embodiment, the instructions may further comprise subtracting the calculated bias from the second gyroscopic data for the current temperature, and filtering out one or more dynamic errors from the second gyroscopic data using a non-linear error model.

In an embodiment, the instructions may further comprise performing a comparison of the change in the temperature with a predefined threshold; and based on the comparison, estimating a bias for a current window.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
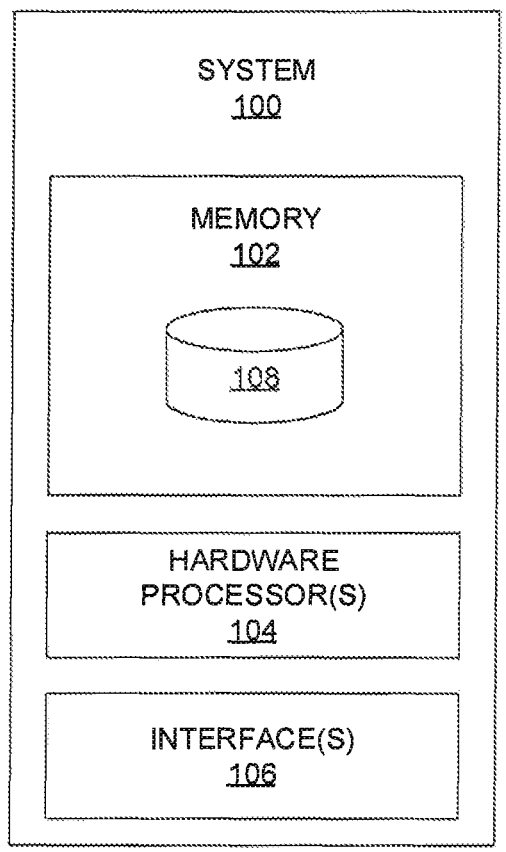
FIG. 1 illustrates an exemplary block diagram of a system 100 for estimating one or more errors in gyroscope sensor(s) in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide systems and methods that establish non-linear components of gyroscope errors which have not been studied or explored earlier. These errors include but are not limited to non-linear dynamic error which is a function of the angular velocity itself. Also, bias instability has been observed within the same environment of temperature and atmospheric pressure. In other words, the embodiments of the present disclosure analyse and models static bias errors and dynamic non-linear errors in the gyroscope sensor which may be then used to model and correct the errors accordingly in subsequent measurements. Primarily the embodiments of the present disclosure provide solution(s) when there is no way of directly estimating the temperature for bias correction of gyroscope, by estimating a temperature change by considering indirect measurements from other sensors present onboard the device. The second contribution of non-linear errors is a secondary contribution, since it is just an acknowledgement of the presence of such errors in gyroscope, and not a solution to remove those errors.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 illustrates an exemplary block diagram of a system 100 for estimating one or more errors in gyroscope sensor(s) in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise, but are not limited to error(s) being calculated by the system 100, temperature readings obtained from an onboard sensor (e.g., a barometer or onboard temperature sensor on a device) gyroscope data, temperature dependent model, etc.

Figure 2:
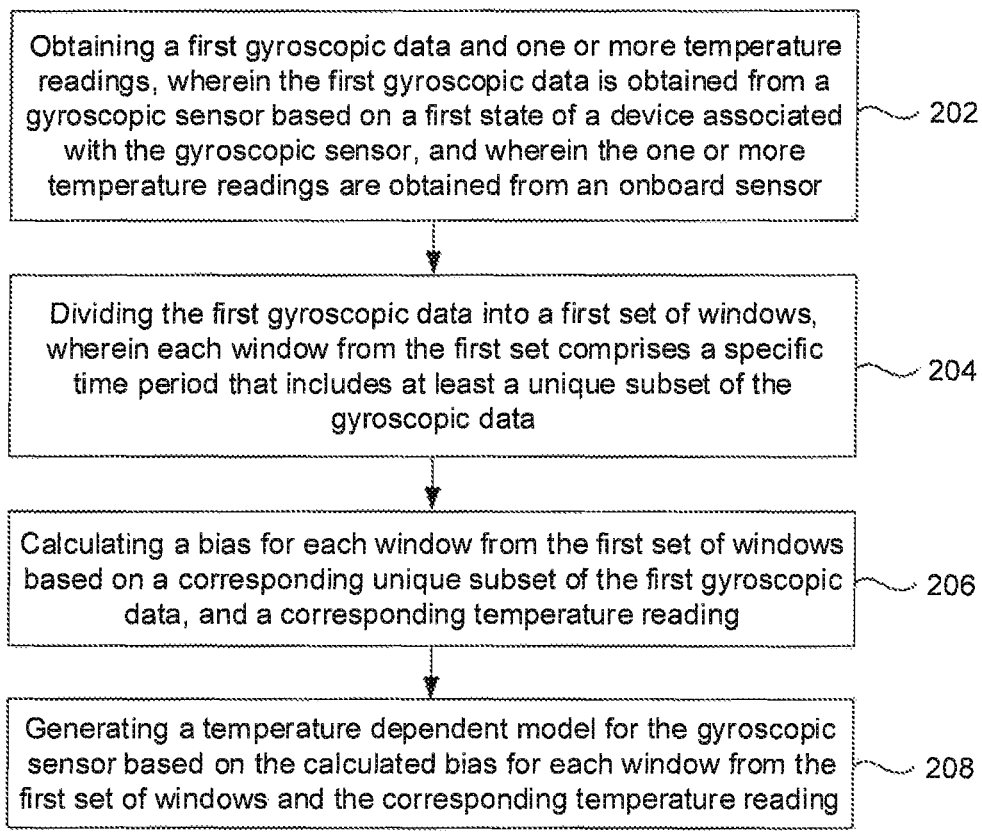
FIG. 2 illustrates an exemplary flow diagram of a method for generating a temperature dependent model for gyroscope sensor(s) using the system of FIG. 1 in accordance with an embodiment of the present disclosure.

FIG. 2, with reference to FIG. 1, illustrates an exemplary flow diagram of a method for generating a temperature dependent model for gyroscope sensor(s) using the system 100 of FIG. 1 in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1, and the flow diagram. In an embodiment of the present disclosure, at step 202, the one or more hardware processors 104 a first gyroscopic data and one or more temperature readings are obtained. In an embodiment, the first gyroscopic data is obtained from a gyroscopic sensor based on a first state of a device associated with the gyroscopic sensor, and wherein the one or more temperature readings are indirectly obtained from an onboard sensor (e.g., a barometer) other than a temperature sensor. In an embodiment, the one or more temperature readings are indirectly obtained from an onboard sensor. In other words, in this implemented by the embodiments of the present disclosure, the system and method utilize a barometer for temperature reading(s). In an embodiment, the system 100 processes the onboard barometer sensor temperature reading(s) that are obtained in order to get an estimate of the actual temperature reading(s). In an embodiment, the first gyroscope data and the one or more temperature readings may be obtained while the device is stationary for all three axes (e.g., x, y, and z axes). The device, for example, may comprise, but is not limited to a mobile communication device, wherein the system 100 may reside in the mobile communication device. In an embodiment of the present disclosure, at step 204, the one or more hardware processors 104 divide the first gyroscopic data into a first set of windows. In an embodiment, each window from the first set comprises a specific time period that includes at least a unique subset of the gyroscopic data. For instance, the first gyroscope data may be divided into windows of 'n' seconds (e.g., 2 seconds). In an embodiment of the present disclosure, at step 206, the one or more hardware processors 104 calculate a bias (e.g., static bias error) for each window from the first set of windows based on a corresponding unique subset of the first gyroscopic data, and a corresponding temperature reading. In an embodiment the bias for each window may be calculated by averaging gyroscope values (or subset of gyroscope data) pertaining that a corresponding window (e.g., 2 second window). For instance, let the calculated bias be b(i) for the ith window, and the corresponding temperature reading be T(i). In an embodiment of the present disclosure, at step 208, the one or more hardware processors 104 generating a temperature dependent model for the gyroscopic sensor based on the calculated bias for each window from the first set of windows and the corresponding temperature reading. Following illustrated is an exemplary way of static bias estimation:

Static Bias:

Data capture (e.g., gyroscope data capture is initiated (e.g., over network) to prevent any possible disturbance. Biases may be studied in the following aspects:

1. Effect of applying a low pass filtration on raw gyroscope data being captured/obtained
2. Changing sampling rate of the captured raw gyroscope data
3. Changing method of integrating $\omega$ to $\theta$ (trapezoidal, etc.) Ideally, $$\int_0^T d\omega_x.dt=0 \quad (1)$$

However, in a non-ideal case, $$d\omega_x.dt=d\theta_x$$

$$E_x=\int_0^T d\theta_x \quad (2)$$

Where E is the total angular error accumulated in x axis. If the error in raw gyroscope data is b (bias), the model would be for linear case when the gyroscope is stationary can be expressed as:

$$\int_0^T d(\omega_x-b_x).dt=0 \quad (3)$$

where $b_x$ is the instantaneous bias in x axis. All the above expressions (1), (2) and (3) are also valid for y and z axes.

The time varying bias can be caused by temperature gradient, since the gyroscope sensor temperature increases continuously after switching on. A relation can be established where the mean bias for one window out of 'y' windows is dependent on the absolute or relative value of temperature around that window. So $b_x=f(Temp)$. A linear relationship is possible, such that:

$$bs_x=a_x.Temp+b_x \quad (4)$$

For estimating the parameters, various stationary gyroscope logs are recorded along with the timestamped temperature reading. For all the logs, linear regression is performed and parameters a and b are estimated. This results in a substantial decrement of accumulated error. Below is a table (Table 1) that depicts bias-corrected angle values as illustrated by way of examples (UC: uncorrected, C: Corrected):

TABLE 1

| Logs | X Axis | | Y Axis | | Z Axis | |
|---|---|---|---|---|---|---|
| | UC (deg) | C (deg) | UC (deg) | C (deg) | UC (deg) | C (deg) |
| Log 1 | 2643 | 26 | 7565 | 104 | 2477 | 39 |
| Log 2 | 2580 | 51 | 7307 | 20 | 2413 | 75 |
| Log 3 | 1466 | 19 | 4210 | 71 | 1364 | 38 |

This method of parameter estimation (as depicted in Table 1) can be performed if the gyroscope chip has an included on-chip temperature sensor, which most of the chips today ship with.

In case there is no temperature sensor, a barometric sensor (atmospheric pressure sensor) can be exploited to get an estimate of the temperature change. Many portable devices nowadays have an on-board pressure sensor. After an initial training, a delta change in temperature of the surroundings can be inferred with a delta change in pressure.

Figure 4:
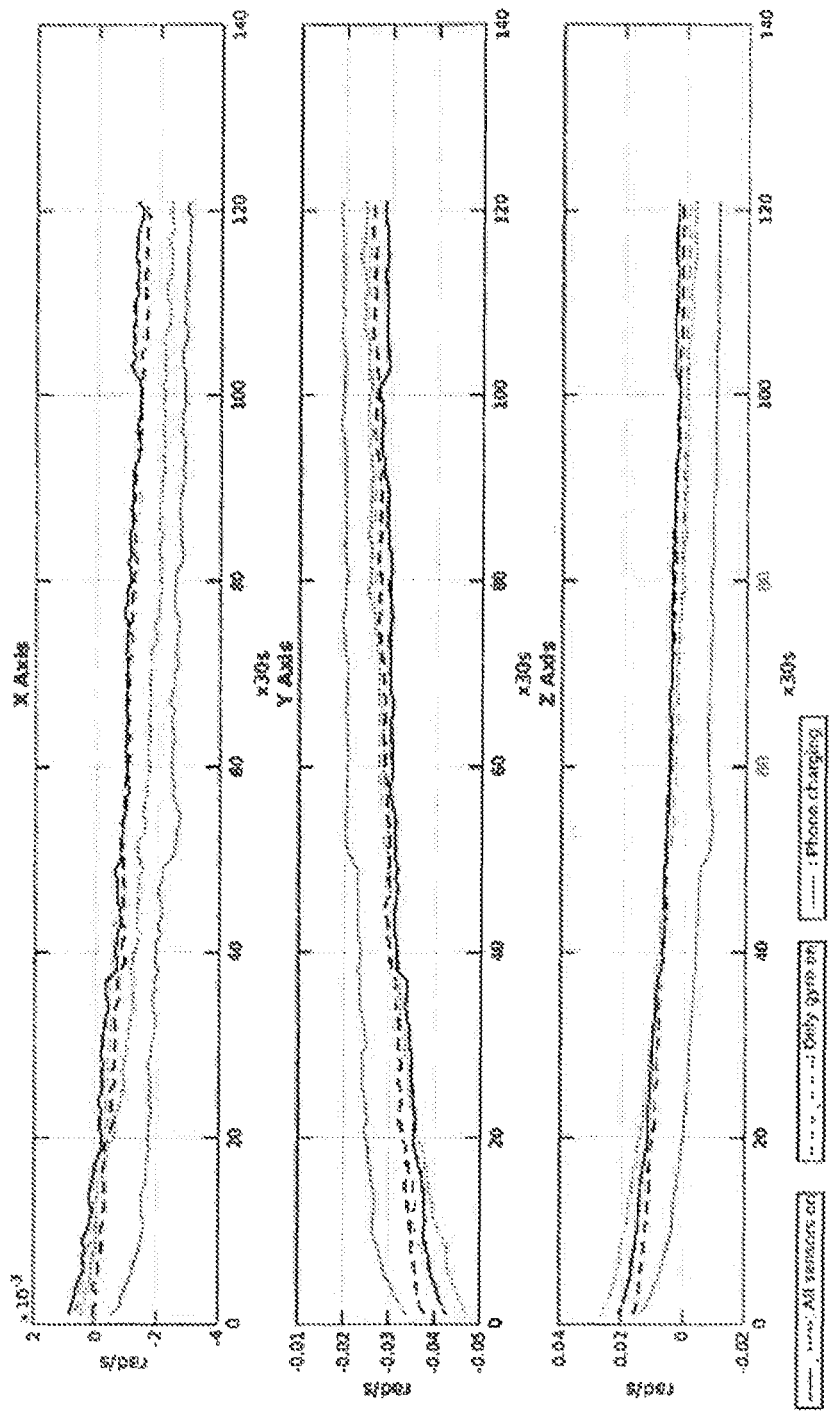
FIG. 4 illustrates graphical representation depicting variation in bias stability during one or more states of the device according to an embodiment of the present disclosure.

When the gyroscope sensor in the device is switched on, after a predetermined time, say, about 10-20 minutes of operation, the static bias stabilizes to a great extent (as shown in graphical representation depicted in FIG. 4). More particularly, FIG. 4 illustrates graphical representation depicting variation in bias stability during one or more states of the device according to an embodiment of the present disclosure. The one or more states comprise, but are not limited to, all sensors turned ON (represented by solid line and dotted line in FIG. 4), only gyroscope turned ON (represented by dashed line and shaded dashed line), and device (or phone) being power charged (represented by shaded dashed line). Along x-axis is time in seconds, and along y-axis of the graphical representation in FIG. 4 is bias stability variation in radians per second for all three axes (e.g., x, y, and z axes). Let this stability timestamp be $T_s$. Let estimated bias at $T_s$ be $bs_1^0$.

Figure 3A:
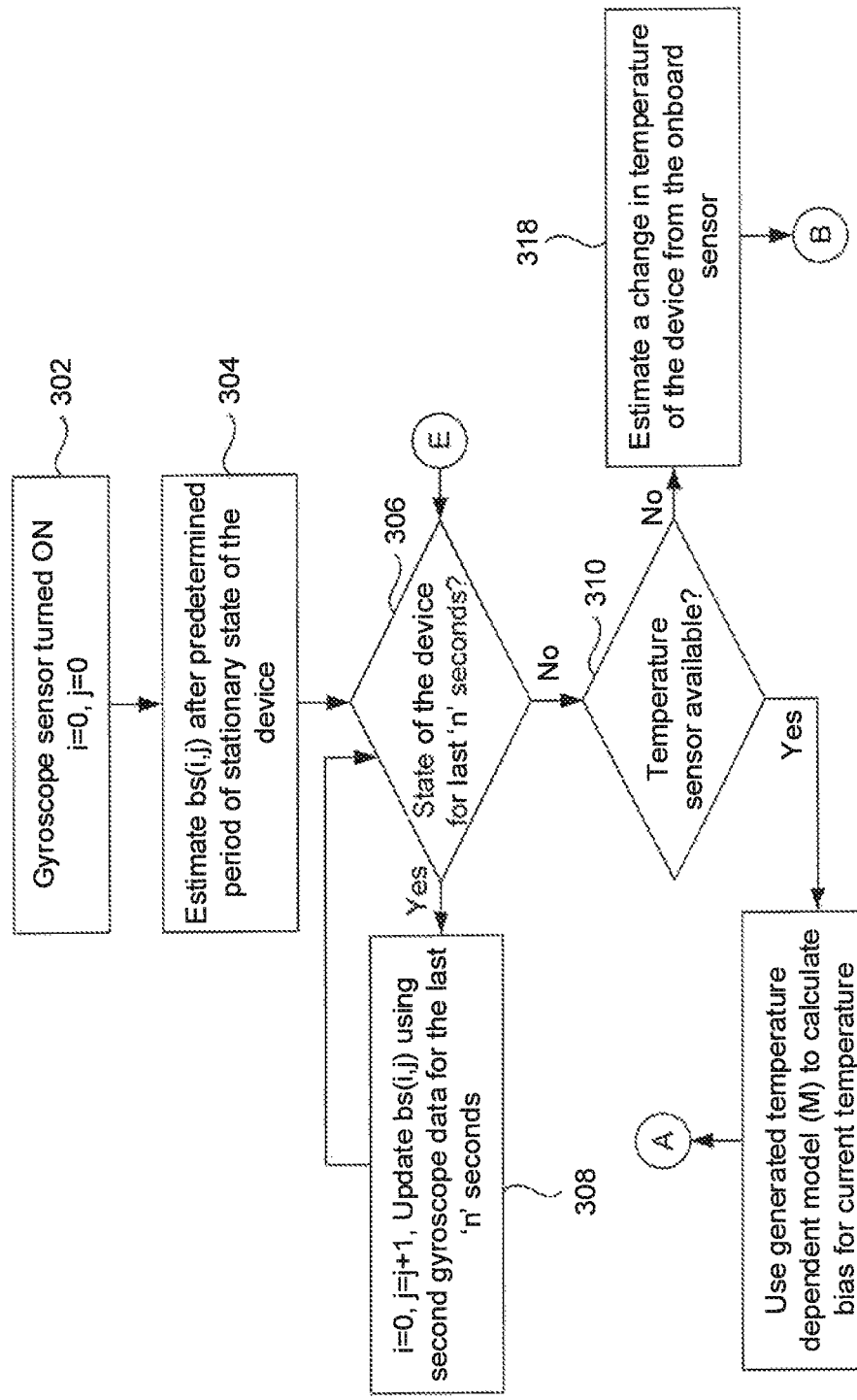
FIG. 3A through 3B is a flow chart illustrating a method for error correction using a generated temperature dependent model according to an embodiment of the present disclosure.
Figure 3B:
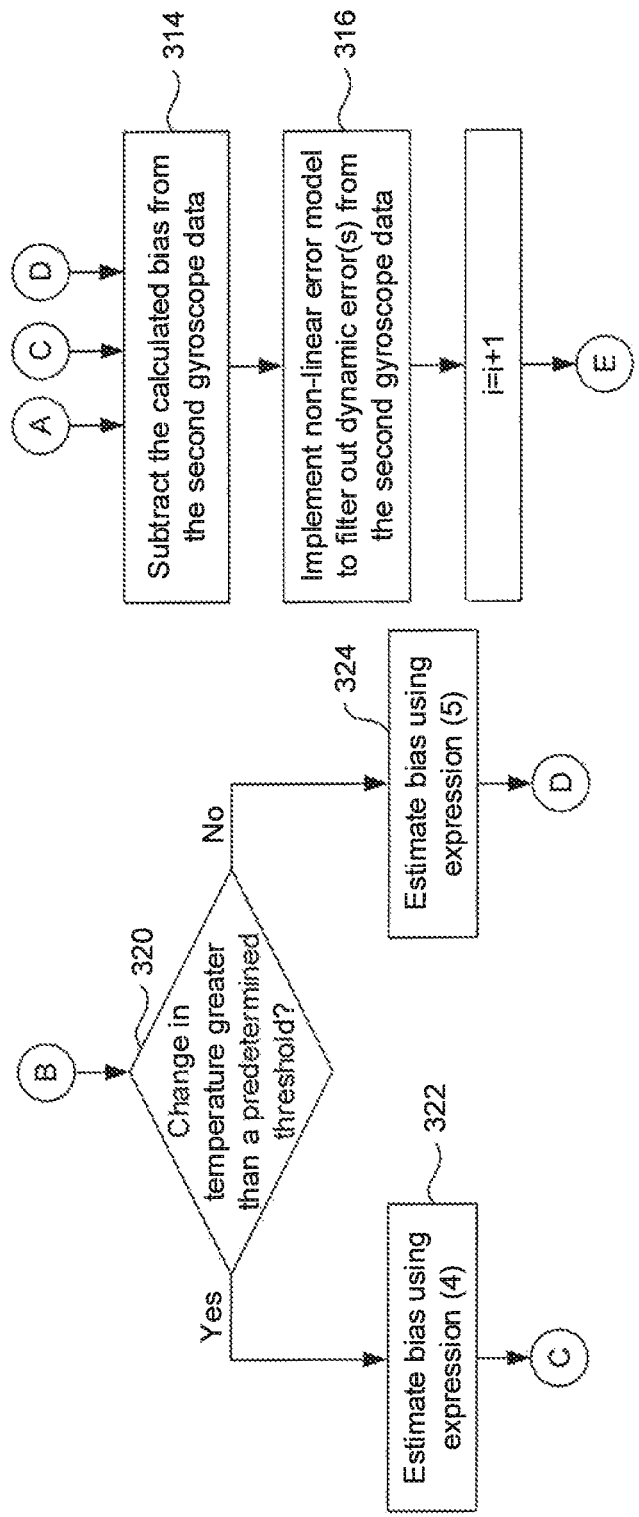

Given an initial value of $bs_1^0$, any change in temperature, $\Delta T$ can be used to infer a change in bias from $bs_1^0$ to $bs_1^1$. Now when the device is in motion after this period, an estimate of temperature change can be inferred from the barometer using the temperature model of the barometer, the subsequent biases can be calculated $bs_1^1$, $bs_1^2$, $bs_1^3$, and so on. In order to maintain accuracy of the bias, a new bias value is calculated as $bs_2^0$ using the mean of raw values of the gyroscope sensor. A subsequent slightly increasing pattern can be assumed for the temperature dependent behaviour of the static bias on time as a linear relationship between the bias and temperature as illustrated with an expression by way of example below:

$$bs_j^i = m.t + bs_j^0 \quad (5)$$

m is the assumed slight slope (which is computed using above expression (5)), t is time since last correction made using the raw gyroscope values, i is the iteration of bias correction using barometer counted from the starting of the jth instance of bias correction using the raw gyroscope values since the gyroscope sensor was turned on. FIG. 3A through 3B, with reference to FIGS. 1-2, is a flow chart illustrating a method for error correction using the generated temperature dependent model according to an embodiment of the present disclosure. More particularly, FIG. 3A through 3B illustrates a method for static and dynamic bias error correction using the generated temperature dependent model. Note that bs(i, j) in the flowchart depicted in step 304 of FIG. 3A is to be read as bsji as in the discussion above.

Referring back to FIG. 2, the embodiments of the present disclosure achieve proposed methodology of estimating errors and correcting thereof in gyroscope sensor(s) by training the system 100 by obtaining a first gyroscope data and temperature readings (or data), wherein the first gyroscopic data is obtained from a gyroscopic sensor based on the state of a device associated with the gyroscopic sensor. As described above, the first gyroscopic data is divided into a plurality of windows, wherein each window comprises a specific time period that includes at least a unique subset of the gyroscopic data. The system 100 further calculates a bias for each of the plurality of windows based on a corresponding unique subset of the first gyroscopic data, and a corresponding temperature. Based on the calculated bias (static bias error) of each window and the corresponding temperature, the system is configured to generate a temperature dependent model during the training stage (or phase).

The steps of the method depicted in FIG. 3A through 3B flowchart of the present disclosure will now be explained with reference to the components of the system 100 as depicted in FIG. 1, and the flow diagram of FIG. 2. In an embodiment of the present disclosure, the system 100 utilizes the generated temperature dependent model to estimate bias of the gyroscope sensor for subsequent gyroscopic data. In an embodiment of the present disclosure, the system 100 is configured to continually receive gyroscopic data from the gyroscopic sensor (or a device associated with thereof). For instance, the system 100 obtains a second gyroscopic data, wherein the second gyroscopic data is obtained from the gyroscopic sensor based on the state of a device associated with the gyroscopic sensor. In an embodiment of the present disclosure, gyroscopic sensor is turned on, and one or more variables (e.g., i, j) are initialized as i=0, and j=0 (refer step 302 of FIG. 3A), wherein 'i' is the iteration of bias correction using barometer counted from the starting of the jth instance of bias correction using raw gyroscope values since the gyroscope was turned on. As implemented in the training stage/phase, the system 100 divides the second gyroscopic data into a plurality of windows, wherein each window comprises a specific time period that includes at least a unique subset of the gyroscopic data. The system 100 further determines a state of the device based on a latest (or current) window of the plurality of windows, and a bias bs(i, j) is calculated/estimated for a predetermined period (e.g., say after 10-20 minutes of stationary state of the device) as shown in step 304 of FIG. 3A.

Based on the state of the device, the system 100 is configured to i) update the bias (static bias error), using the second gyroscopic data (raw gyroscope data), for the latest/current window (last 'n' seconds), and value of 'i' is 0, and value of 'j' is incremented by 1 (e.g., j=j+1) at step 308 and the step 306 may be repeated; or determine an availability of a temperature sensor (or temperature data) at step 310. In an embodiment, state of the device (or the gyroscope sensor) is determined to be either stationary or in motion at step 306. In an embodiment, the state of the device is determined whether it is stationary for the last 'n' seconds (e.g., where 'n' is 2). Further, based on the availability of the temperature sensor/the onboard sensor (or temperature data/reading), the system 100 (or the one or more hardware processor(s) 104) performs at step 312 one of: calculating, using the temperature dependent model (M), a bias (static bias error) for a current temperature, and determining a state of the device based on a latest window of the plurality of windows; and estimate a change in the temperature of the device based on the onboard sensor associated with the device. In an embodiment, when the onboard sensor/barometer (or temperature data/reading) is available, the step of calculating, using the temperature dependent model (M), a bias (static bias error) for a current temperature, and determining a state of the device based on a latest window of the plurality of windows is performed. In another embodiment, when the onboard sensor/barometer (or temperature data/reading)/temperature sensor is unavailable, a change in the temperature of the device is estimated based on the onboard sensor associated with the device.

In an embodiment of the present disclosure, the bias (static bias error) for the current temperature is calculated using the temperature dependent model by way of the expression (4) which is as illustrated below:

$$bs_x = a_x \cdot \text{Temp} + b_x \quad (4)$$

wherein 'bs$_x$' is a static bias. As described above, for estimating the parameters, various stationary gyroscope logs are recorded along with the timestamped temperature reading. For all the logs, linear regression is performed and parameters a and b are estimated, which results in a substantial decrement of accumulated error. Upon calculating the bias (static bias error) of the current temperature, the system 100 subtracts the calculated bias from the second gyroscopic data at step 314, and implements a non-linear error model to filter out dynamic errors from the second gyroscopic data at step 316, and further increments value of 'i' (e.g., i=i+1) thereby repeating the step 306 which is determining a state of the device (e.g., stationary or moving) based on a latest (or current) window of a plurality of windows.

In a scenario wherein there is no temperature sensor/the onboard sensor (or temperature data) available, the system 100 is configured to estimate (or estimates) a change in the temperature of the device based on an onboard sensor associated with the device at step 318. In an embodiment of the present disclosure, the onboard sensor may comprise of a barometer, and the like. Upon estimating the change in the temperature, the system 100 further performs a comparison of the change in the temperature with a predefined threshold at step 320, and based on the comparison the system 100 estimates a bias (static bias error) for a latest window by using the expression/equation (5) as illustrated and increments value of 'i' thereby repeating the step of 306 which is determining a state of the device (e.g., stationary or moving) based on a latest (or current) window of a plurality of windows. In an embodiment of the present disclosure, when the change in the temperature is greater than the predefined threshold, the system 100 estimates bias (static bias error) using the above expression/equation (4) at step 322 (wherein the estimated bias may be less accurate due to inherent error(s) in the barometer readings). In other words, the system is configured to use a linear relation between temperature and gyroscope bias with linear parameters calculated in training stage in order to estimate bias (static bias error) for current data window. The relation reflects the instantaneous bias to be used when there is a sudden change in ambient temperature (e.g., a person leaves an air-cooled room to a warmer area). The system 100 further subtracts the calculated/estimated bias (of step 322) from the second gyroscopic data (which is repeating step 314), and implements a non-linear error model to filter out dynamic errors (non-linear errors) from the second gyroscopic data (which is repeating step 316), and further increments value of 'i' thereby repeating the step 306 which is determining a state of the device (e.g., stationary or moving) based on a latest (or current) window of a plurality of windows. This dynamic error shows up when the device (e.g., a mobile communication device) is rotated at different speeds around an axis. It may be more pronounced when the rotation speeds are (very) high.

Else, when the change in the temperature is less than or equal to the predefined threshold, the system 100 estimates bias by using the expression/equation (5) at step 324. In other words, when the change in the temperature is less than or equal to the predefined threshold, the system 100 estimates bias by using the expression/equation (5) and subtracts the calculated/estimated bias (of step 324) from the second gyroscopic data (which is repeating step 314), and implements a non-linear error model to filter out dynamic errors from the second gyroscopic data (which is repeating step 316), and further increments value of 'i' thereby repeating the step 306 which is determining a state of the device (e.g., stationary or moving) based on a latest (or current) window of a plurality of windows. In further words, when the temperature change with respect to previous data window is less than threshold, the system 100 is configured to use the linear relation between bias and time with the slope parameter as calculated in the training stage (wherein the intercept parameter is the bias calculated for the previous data window).

Experimental Steps

Rotate the phone at different speeds along an axes
Remove static bias
Find out a relational factor between ω and error observed in integrated ω in the domain of θ
An approach may be to divide the rotational speed to bins and determine the factors for each bin.

Introduce a delay δ between two consecutive rotations, both made at similar ω. Vary δ between say 100 milliseconds, 500 milliseconds, 1 sec, 5 sec. This is to determine if there is a "time gap of being stationary", where the gyroscope sensor "settles down", i.e., errors do not keep accumulating.

In this case, expression/equation (4) is modeled as illustrated below:

$$b_x = f_{NL}(\omega_x, \omega_y, \omega_z) \quad (6)$$

Assuming the model to be polynomial (for x axis), $$b_x = f_{NL}(W_{xx}(\omega_x)^{xm}, W_{xy}(\omega_y)^{xn}, W_{xz}(\omega_z)^{xp} \quad (7)$$

Inserting expression/equation (6) value back into equation (3), the following is obtained:

$$\int_0^T d(\omega_x - f_{NL}(W_{xx}(\omega_x)^{xm}, W_{xy}(\omega_y)^{xn}, W_{xz}(\omega_z)^{xp})).dt = \theta_x \quad (8)$$

Above equation/expression (7) forms the final working equation for dynamic modelling, once all the error forms are verified, where $\theta_x$ is the actual angle covered by the rotation, along the x-axis. Hence, numerical integration using various methods like Newton-Raphson or Trapezoidal can be implemented to determine all the parameters. For the experimental setup a method to accurately estimate the w along each axis is required, which requires aid from a simple mechatronics system like a multi-rotator where angular velocity can be controlled. Having gathered the data, any standard regression technique can be used and implemented to estimate the various error parameters thereby creating/generating a model that would determine the accurate integrated angle θ.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "Including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for estimating errors in a gyroscope sensor, the method comprising:
    obtaining (202), a first gyroscopic data and one or more temperature readings, wherein the first gyroscopic data is obtained from a gyroscopic sensor based on a first state of a device associated with the gyroscopic sensor, and wherein the one or more temperature readings are obtained from an onboard sensor;
    dividing (204), the first gyroscopic data into a first set of windows, wherein each window from the first set comprises a specific time period that includes at least a unique subset of the gyroscopic data;
    calculating (206), a bias for each window from the first set of windows based on a corresponding unique subset of the first gyroscopic data, and a corresponding temperature reading;
    generating (208) a temperature dependent model for the gyroscopic sensor based on the calculated bias for each window from the first set of windows and the corresponding temperature reading;
    obtaining a second gyroscopic data from the gyroscopic sensor based on a second state of the device associated with the gyroscopic sensor;
    dividing the second gyroscopic data divided into a second set of windows, wherein each window from the second set comprises a specific time period that includes at least a unique subset of the second gyroscopic data; and
    determining a third state of the device based on a current window of the second set.

2. The processor implemented method of claim 1, further comprising:
    based on the third state, performing at least one of:
        updating the bias, using the second gyroscopic data, for the current window; and
        determining an availability of a temperature reading from the onboard sensor.

3. The processor implemented method of claim 2, further comprising:
    based on the availability of the onboard sensor, performing at least one of:
        calculating, using the temperature dependent model, a bias from the second gyroscopic data for a current temperature, and determining a state of the device based on a current window of the second set of windows; and
        estimating a change in the temperature of the device based on the onboard sensor associated with the device.

4. The processor implemented method of claim 3, further comprising subtracting the calculated bias from the second gyroscopic data, and filtering out one or more dynamic errors from the second gyroscopic data using a non-linear error model.

5. The processor implemented method of claim 3, further comprising:
performing a comparison of the change in the temperature with a predefined threshold; and
based on the comparison, estimating a bias for a current window.

6. A system (100), comprising:
a memory (102) storing instructions;
one or more communication interfaces (106); and
one or more hardware processors (104) coupled to the memory (102) via the one or more communication interfaces (106), wherein the one or more hardware processors (104) are configured by the instructions to:
obtain a first gyroscopic data and one or more temperature readings, wherein the first gyroscopic data is obtained from a gyroscopic sensor based on a first state of a device associated with the gyroscopic sensor, and wherein the one or more temperature readings are obtained from an onboard sensor;
divide the first gyroscopic data into a first set of windows, wherein each window from the first set comprises a specific time period that includes at least a unique subset of the gyroscopic data;
calculate a bias for each window from the first set of windows based on a corresponding unique subset of the first gyroscopic data, and a corresponding temperature reading;
generate a temperature dependent model for the gyroscopic sensor based on the calculated bias for each window from the first set of windows and the corresponding temperature reading;
obtain a second gyroscopic data from the gyroscopic sensor based on a second state of a device associated with the gyroscopic sensor;
divide the second gyroscopic data divided into a second set of windows, wherein each window from the second set comprises a specific time period that includes at least a unique subset of the second gyroscopic data; and
determine a third state of the device based on a current window of the second set.

7. The system of claim 6, wherein based on the third state, the one or more hardware processors are further configured by instructions to:
update the bias, using the second gyroscopic data, for the current window; or
determine an availability of a temperature reading from the onboard sensor.

8. The system of claim 7, based on the availability of the onboard sensor, the one or more hardware processors are further configured by instructions to perform at least one of:
calculating, using the temperature dependent model, a bias from the second gyroscopic data for a current temperature, and determining a state of the device based on a current window of the second set of windows; and
estimating a change in the temperature of the device based on the onboard sensor associated with the device.

9. The system of claim 8, wherein the one or more hardware processors are further configured by instructions to:
subtract the calculated bias from the second gyroscopic data, and filtering out one or more dynamic errors from the second gyroscopic data using a non-linear error model.

10. The system of claim 8, wherein the one or more hardware processors are further configured by instructions to
perform a comparison of the change in the temperature with a predefined threshold; and
based on the comparison, estimate a bias for a current window.

11. One or more non-transitory machine readable information storage mediums comprising one or more instructions which when executed by one or more hardware processors causes a method for estimating errors in a gyroscope sensor, the method comprising:
obtaining, a first gyroscopic data and one or more temperature readings, wherein the first gyroscopic data is obtained from a gyroscopic sensor based on a first state of a device associated with the gyroscopic sensor, and wherein the one or more temperature readings are obtained from an onboard sensor;
dividing, the first gyroscopic data into a first set of windows, wherein each window from the first set comprises a specific time period that includes at least a unique subset of the gyroscopic data;
calculating, a bias for each window from the first set of windows based on a corresponding unique subset of the first gyroscopic data, and a corresponding temperature reading;
generating a temperature dependent model for the gyroscopic sensor based on the calculated bias for each window from the first set of windows and the corresponding temperature reading;
obtaining a second gyroscopic data from the gyroscopic sensor based on a second state of a device associated with the gyroscopic sensor;
dividing the second gyroscopic data divided into a second set of windows, wherein each window from the second set comprises a specific time period that includes at least a unique subset of the second gyroscopic data; and
determining a third state of the device based on a current window of the second set.

12. The one or more non-transitory machine readable information storage mediums of claim 11, wherein the method further comprises: based on the third state, performing at least one of:
updating the bias, using the second gyroscopic data, for the current window; and
determining an availability of a temperature reading from the onboard sensor.

13. The one or more non-transitory machine readable information storage mediums of claim 12, wherein the method further comprises:
based on the availability of the onboard sensor, performing at least one of:
calculating, using the temperature dependent model, a bias from the second gyroscopic data for a current temperature, and determining a state of the device based on a current window of the second set of windows; and
estimating a change in the temperature of the device based on the onboard sensor associated with the device.

14. The one or more non-transitory machine readable information storage mediums of claim 13, wherein the method further comprises:

subtracting the calculated bias from the second gyroscopic data, and filtering out one or more dynamic errors from the second gyroscopic data using a non-linear error model.

15. The one or more non-transitory machine readable information storage mediums of claim 13, wherein the method further comprises:
   performing a comparison of the change in the temperature with a predefined threshold; and
   based on the comparison, estimating a bias for a current window.

* * * * *